United States Patent
Gungabeesoon et al.

(10) Patent No.: US 11,226,813 B2
(45) Date of Patent: Jan. 18, 2022

(54) SYSTEM AND METHOD FOR AUTOMATED SOURCE CODE GENERATION TO PROVIDE SERVICE LAYER FUNCTIONALITY FOR LEGACY COMPUTING SYSTEMS IN A SERVICE-ORIENTED ARCHITECTURE

(71) Applicant: Next Pathway Inc., Toronto (CA)

(72) Inventors: Satish Gungabeesoon, Markham (CA); Zhe Yang, North York (CA)

(73) Assignee: Next Pathway Inc., Toronto (CA)

( * ) Notice: Subject to any disclaimer, the term of this patent is extended or adjusted under 35 U.S.C. 154(b) by 0 days.

(21) Appl. No.: 16/916,716

(22) Filed: Jun. 30, 2020

(65) Prior Publication Data

US 2021/0004226 A1  Jan. 7, 2021

Related U.S. Application Data (60) Provisional application No. 62/869,130, filed on Jul. 1, 2019.

(51) Int. Cl.
| | |
|---|---|
| *G06F 9/45* | (2006.01) |
| *G06F 8/71* | (2018.01) |
| *G06F 8/60* | (2018.01) |
| *G06F 9/54* | (2006.01) |
| *G06F 8/41* | (2018.01) |
| *G06F 8/30* | (2018.01) |

(52) U.S. Cl.
CPC .............. *G06F 8/71* (2013.01); *G06F 8/30* (2013.01); *G06F 8/4452* (2013.01); *G06F 8/60* (2013.01); *G06F 9/541* (2013.01)

(58) Field of Classification Search
CPC . G06F 8/71; G06F 8/30; G06F 8/4452; G06F 8/60; G06F 9/541
USPC .......................... 717/140.106, 121, 136, 140
See application file for complete search history.

(56) References Cited

U.S. PATENT DOCUMENTS

| | | | | |
|---|---|---|---|---|
| 2006/0179425 | A1* | 8/2006 | Scougall | G06F 9/541 717/140 |
| 2007/0260629 | A1* | 11/2007 | Tseitlin | G06F 8/60 |
| 2008/0109524 | A1* | 5/2008 | Meadows | H04L 67/02 709/207 |

(Continued)

OTHER PUBLICATIONS

Cloud computing: security issues and challenges author: MA Nadeem published on 2016.*

(Continued)

*Primary Examiner* — Chameli Das
(74) *Attorney, Agent, or Firm* — The Webb Law Firm (57) ABSTRACT

A system and method to automatically generate a software service to provide service layer functionalities to legacy computing systems that are inherently incompatible with a Service Oriented Architecture (SOA) consumer environment. A configuration specification defining the characteristics of the software service, including data mapping rules is received. Based on the specification, at least one pattern template for the software service is selected from a library of templates. The pattern templates provide source code patterns usable to build the software service. Source code of the software service is outputted using programming code provided in the at least one design pattern template. The outputted source code is packaged or assembled into a source code package for deployment.

13 Claims, 3 Drawing Sheets

(56) References Cited

U.S. PATENT DOCUMENTS

| | | | | |
|---|---|---|---|---|
| 2012/0191665 A1* | 7/2012 | Floyd | .................... | H04L 67/141 |
| | | | | 707/687 |
| 2012/0290749 A1* | 11/2012 | Moench | .............. | H04L 67/2823 |
| | | | | 710/63 |
| 2013/0219411 A1* | 8/2013 | Meeker | ................... | G06F 9/541 |
| | | | | 719/313 |
| 2014/0007136 A1* | 1/2014 | Bettin | ..................... | G06F 9/541 |
| | | | | 719/313 |
| 2014/0310686 A1* | 10/2014 | Srinivasan | ................ | G06F 8/72 |
| | | | | 717/120 |
| 2017/0163645 A1* | 6/2017 | Bradley | .............. | H04L 67/1061 |
| 2020/0160300 A1* | 5/2020 | Thornton | ........... | G06Q 20/1235 |
| 2020/0220823 A1* | 7/2020 | Eirinberg | ........... | G06Q 30/0209 |

OTHER PUBLICATIONS

Title: Consumer-centric service-oriented architecture: A new approach, author: WT Tsai, published on 2006.*

Title: Sassy: A framework for self-architecting service-oriented systems, author: D Menasce, published on 2011, Source: IEEE.*

\* cited by examiner

SYSTEM AND METHOD FOR AUTOMATED SOURCE CODE GENERATION TO PROVIDE SERVICE LAYER FUNCTIONALITY FOR LEGACY COMPUTING SYSTEMS IN A SERVICE-ORIENTED ARCHITECTURE

CROSS-REFERENCE TO RELATED APPLICATION

This application claims priority to U.S. Provisional Patent Application No. 62/869,130 filed Jul. 1, 2019, the disclosure of which is hereby incorporated by reference in its entirety.

TECHNICAL FIELD

The present disclosure relates generally to automated source code generation, and more specifically to a method and system for automatically generating source code to provide service layer functionalities for legacy computing systems in a service-oriented architecture ("SOA").

BACKGROUND

Advancements in cloud-based technologies have enabled the establishment of highly versatile and scalable computing systems. Such systems are highly appealing to business users that desire to maintain and operate their corporate and enterprise information systems within a distributed computing environment. Modern computing environments often operate according to a service-oriented architecture ("SOA") in which computing functionalities are provided in the form of services, such as web services, that are accessible through a corresponding interface such as a SOAP (Simple Object Access Protocol) interface or a RESTful (Representational State Transfer) interface.

At the same time, enterprise-level information technology ("IT") systems often include legacy computing systems providing legacy services which are inherently incompatible with the SOA environment. As such, legacy systems may not be readily enabled for exchanging data or messages with components residing in the SOA environment.

Existing solutions to expose legacy services provided by legacy computing systems residing in so-called "core backend systems" make use of a manual approach to manually develop services in a service layer to follow SOA standards and operates as an interface to legacy systems. Such an approach has inherent disadvantages including a lack of standardization in service design and code development, an inability to effectively implement governance controls throughout the development process, a greater likelihood of introducing human error, and higher development times.

Accordingly, in view of the foregoing deficiencies, there is a need for a system and method to automate the generation of SOA service source code for deployment in the service layer.

SUMMARY OF THE DISCLOSURE

In general, the present specification describes a system and method to automatically generate source code for SOA services that expose computing and/or software functionalities available on legacy computing systems to a service-oriented computing environment.

According to one aspect of the invention, there is provided a method to automatically generate a software service for exchanging data and messages between a first computing system and a second computing system. The method includes providing a configuration specification defining the software service; selecting at least one pattern template for the software service defined by the configuration specification; outputting source code corresponding to the software service using programming code provided in the selected at least one pattern template; and assembling the outputted source code into a source code package corresponding to the software service.

In some embodiments, the method further includes validating the configuration specification prior to selecting the at least one pattern template. In other embodiments, the method includes building the source code package to binary objects corresponding to the software service. In some cases, software service is tested upon deploying the binary objects. The software service may be promoted for use upon publication of the software service.

In some embodiments, the configuration specification defines at least one first computing system interface for communicating and exchanging data and messages between the software service and the first computing system, and a second computing system interface for communicating and exchanging data and messages between the software service and the second computing system. The configuration specification may include at least one data transformation rule for transforming data by the software service, the data being exchanged between the first computing system and the second computing system. The first computing system operates within a service oriented architecture environment that is incompatible with the second computing system, while the second computing system is a legacy computing system that is incompatible with the first computing system.

A according to another aspect of the invention, there is provided a system to automatically generate a software service for exchanging data and messages between a first computing system and a second computing system. Such a system includes a service configuration pipeline operable to receive a configuration specification defining the software service; and a service delivery pipeline operable to: select at least one pattern template for the software service defined by the configuration specification; output source code corresponding to the software service using programming code provided in the selected at least one pattern template; and assemble the outputted source code into a source code package corresponding to the software service.

In some embodiments, the system further includes a data storage system to store the source code package. The system may also include a graphical user interface for inputting the configuration specification by a user of the system.

In some embodiments, the service configuration pipeline is activated prior to the service delivery pipeline being activated. The service configuration pipeline can be further operated to validate the configuration specification prior to selecting the at least one pattern template. In other embodiments, the service delivery pipeline is further operable to build the source code package to binary objects corresponding to the software service.

Additional aspects of the present invention will be apparent in view of the description which follows.

BRIEF DESCRIPTION OF THE DRAWINGS

Features and advantages of the embodiments of the present invention will become apparent from the following detailed description, taken with reference to the appended drawings in which.

DETAILED DESCRIPTION

The description which follows, and the embodiments described therein, are provided by way of illustration of examples of particular embodiments of the principles of the present invention. These examples are provided for the purpose of explanation, and not limitation, of those principles and of the invention.

Service Oriented Architecture ("SOA") is a construction technique based on the separation of tasks into independent logical units that can be used to build enterprise information technology ("IT") services and functionalities, and to achieve enterprise agility and resilience through independent IT services defined in the context of business activities. Applications and data are broken down into discrete, independent components as "decoupled services" that can be executed in a highly distributed, scalable and reusable manner. The use of decoupled components increases business agility and enables IT departments to share and reuse services that have known scalability and quality of service characteristics. The ability to reuse such services reduces redundancy, duplication and time-to-market for developed components, as well as the development costs thereof.

For the purpose of the present disclosure, a "legacy system" refers to a transactional computing system built on mainframe or midrange computer technologies. As such, a legacy system does not interface natively with external digital devices, nor interact with modern distributed architectures that are service oriented (e.g., SOA Service Consumers Layer 110 of FIG. 1 described in greater detail below). Legacy systems typically require an interface layer or interface service to externalize their core functions to allow the legacy system to communicate and exchange data/information with a higher-level software architecture stack, which is generally built using modern technology components and techniques.

Legacy systems as described above may not be readily enabled for exchanging messages and data with a SOA consumer services layer. Typical challenges include:

Statefulness of the legacy system: multiple calls are typically required to complete a transaction request, with the need to persist execution data between adjacent calls, leading to resources being locked while the legacy system processes the response from each call, thereby limiting the scalability of such a system to support a large number of concurrent callers; and Non-programmatic interfaces: legacy transactional systems that were developed for presenting their information to terminals or native devices typically exchange presentation data to their display devices. Such systems need to be refactored to decouple transaction data from presentation-specific data, each transaction being associated with a clearly defined call-point and interface into the system.

It is a challenge for an enterprise to adopt and implement a real business-driven SOA architecture and deliver highly reusable SOA services which follow SOA standards, policies, design patterns, and best practices, and this is due to the following reasons:

Practical methodologies are lacking to enforce a large list of enterprise SOA service and application standards.

For instance, the traditional way of implementing SOA governance during the course of a service delivery relies on solution architects to manually review and verify for SOA standards compliance, which is not applicable to today's service delivery projects since the project's development team would have largely adopted the Agile project delivery methodology; and There is also a lack of automation in service design and development methodologies that follow SOA design patterns and best practices. For example, services are traditionally created by designers based on their own experience and their level or depth of knowledge of available design patterns, and such services are then constructed manually by developers based on the developers' own experience. As a result, the services developed do not follow consistent design standards even though such services are supposed to be implemented based on the same design patterns. Given this, the cost of support and maintenance is hardly controlled with traditional development techniques.

Figure 1:
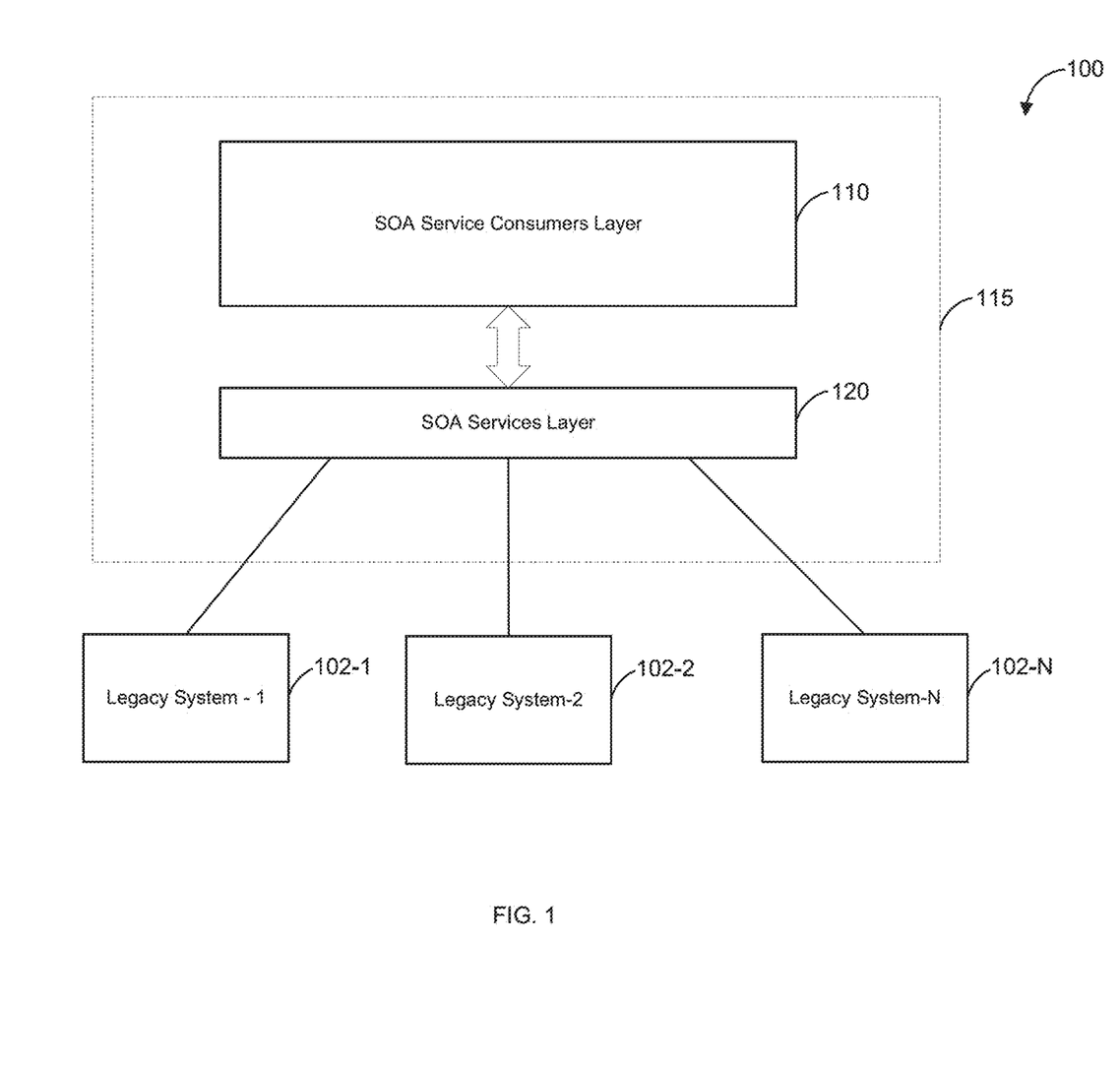
FIG. 1 is a block diagram of an architecture incorporating a SOA services layer to provide SOA services.

The existing manual approach noted above to create a service for interfacing between legacy systems and modern SOA Service Consumers Layer 110 of FIG. 1 reveal various disadvantages, including a lack of automation for all aspects of the creation of the service-oriented layer that provides support for exchanging messages with distributed modern architectures. Additionally, existing solutions fail to adopt a built-in approach for at least one of the following:

Standardized SOA service design and coding;
Automatic adherence to industry SOA standards;
Automated SOA service code generation from specifications;
Automated SOA service code testing based on supplied test data;
Automated SOA service development governance;
Automated SOA service registration and promotion;
Automatic inclusion of SOA best practices; and
Automated workflow for the entire service development lifecycle.

Disclosed herein is a system and method, and more specifically, an automated and integrated SOA service delivery platform, called a "SOA Service Factory", that is intended to accelerate and standardize SOA service delivery by automating the processes of service configuration, service source code generation, service build, service testing, service publishing, service promotion, service deployment and service governance throughout a Software Development Life Cycle ("SDLC") of a service from its inception to production. As will be described in greater detail below, a SOA Service Factory Engine is built on DevOps (Development and Operations) friendly CI (Continuous Integration) pipelines (i.e. processes) to execute a service source code generator of the SOA Service Factory in order to produce well-formed and standardized services for a SOA environment, such as IBM™ DataPower™, based on industry standard design patterns and best practices. The SOA Service Factory helps alleviate service developers from often time-consuming, tedious, and error-prone manual service configuration and service code development tasks while allowing them to focus on implementing service data mapping (e.g. data transformation) rules. The code of the services generated by the SOA Service Factory service code generator follows consistent design and coding standards if their design and implementation are based on the same integration design patterns, thus the cost of support and maintenance can be expected to be reduced.

The operation of the SOA Service Factory is intended to provide completeness, consistency, and correctness of a service delivery through automating service coding, configuration, service delivery and governance approval processes to enforce SOA service standards while alleviating service developers from tedious and error prone manual service configuration and code development. As described in greater detail below, the SOA Service Factory includes a Service Generator module which follows industry standard service integration design patterns and best practices to generate service code. This approach would, by default, be used to guarantee that the design and corresponding coding of the service follows accepted enterprise SOA service standards and coding best practices. As noted above, it is intended that service developers would only need to focus on implementing service data mapping rules defined by service designers. Described in more details below are the various modules of the SOA Service Factory to provide DevOps CI pipelines, which improve the agility of developing and delivering service runnable artifacts to the target platforms.

Referring first to FIG. 1, shown therein is a block diagram of an architecture 100 to enable the resources and/or functionalities available on one or more legacy computing systems 102-1 to 102-N (collectively, 102) to be available and accessible within SOA Service Consumers Layer 110. Elements within the SOA Service Consumers Layer 110 may include computing systems residing in modern distributed architectures that are service oriented and would otherwise be operatively incompatible with the legacy computing systems 102. As will be described in greater detail below, SOA services are deployed within a SOA services layer 120 which provides an interface between the legacy systems 102-1 to 102-N and the SOA Service Consumers Layer 110. The SOA services layer 120 and the SOA Service Consumers Layer 110 can be considered a component of an overall SOA environment as represented by dashed line 115, in which the SOA services layer 120 provides a point of access to the legacy computing systems 102. For the purpose of this disclosure, a "service" can be a software process, software application, application programming interface and the like that provide functionalities such as communication and access to one or more computing resources, computing functionalities and/or computing systems. For example, in an IBM™ DataPower™ Gateway, the services contemplated can be DataPower™ services.

Services residing within the SOA services layer 120 are SOA services operable to communicate and exchange data and messages with one or more of the legacy systems 102-1 to 102-N underneath the SOA services layer 120. Each service is configured to communicate using protocols and methods specific to one or more targeted legacy system(s) 102. Each service residing in the SOA services layer 120 can be used and reused by multiple service consumers, for example as applications or other services, residing in the SOA Service Consumers Layer 110 to exchange information with one or more targeted legacy system(s) 102. Such services residing within the SOA services layer 120 enable exposure of services and/or functionalities that would otherwise be locked within core back-end legacy systems, thereby enabling these legacy systems to operate within modern computing environments without undertaking often costly modernization projects that could include software code refactoring initiatives.

Figure 2:
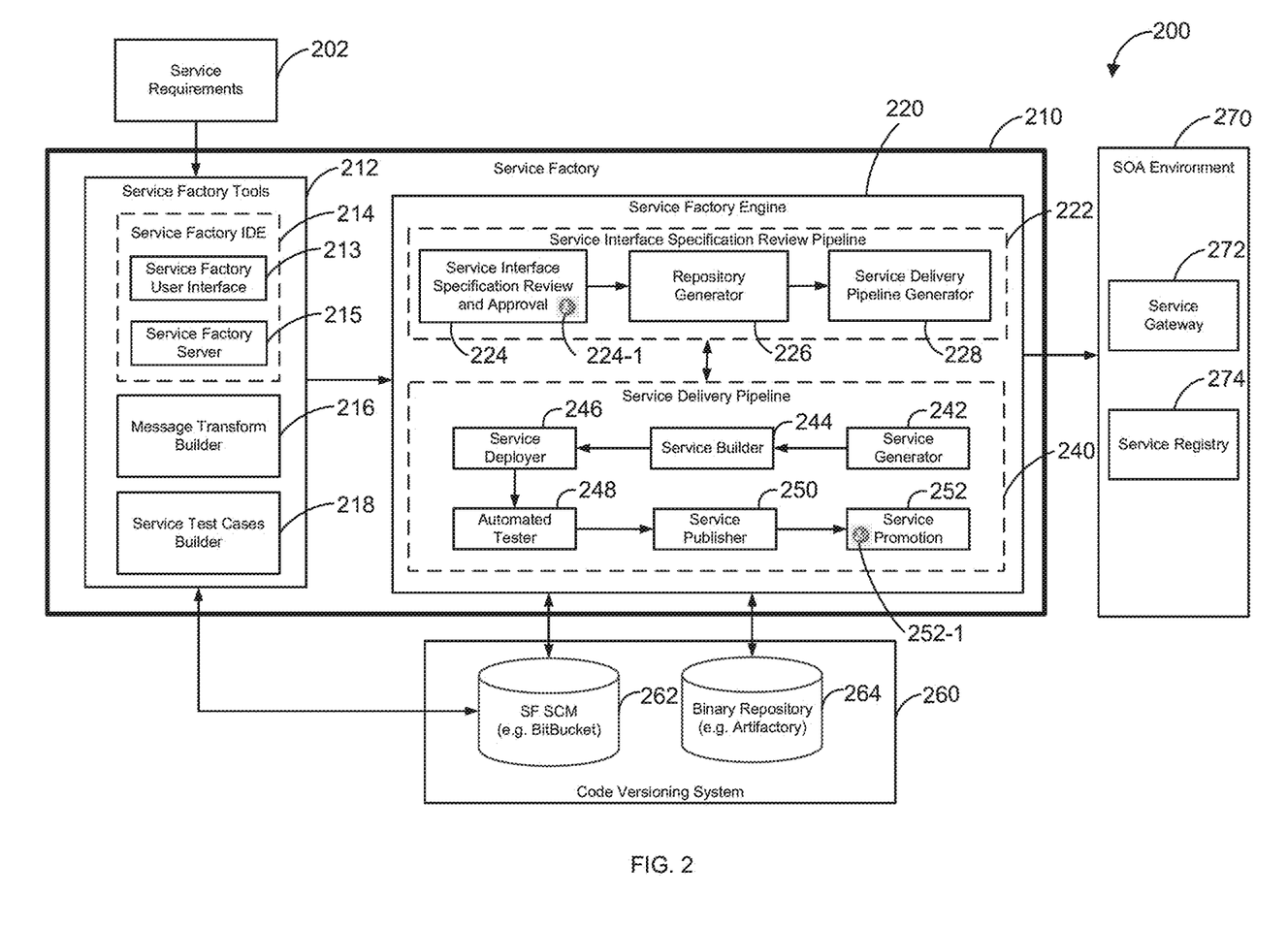
FIG. 2 is a block diagram depicting the architecture of a SOA Service Factory, a SOA service delivery platform to automate SOA service delivery.

FIG. 2 is a block diagram depicting the architecture of a SOA Service Factory, an automated SOA service delivery platform 200 according to an embodiment of the invention for specifying, generating, verifying and deploying services that enable resources and functionalities residing in one or more legacy systems to be accessible within a SOA environment 270. The Service Factory 210 can be hosted on a local or on-premises computing system or by way of a distributed or cloud-based environment located remotely at a data center (e.g. Google™ Cloud Services or Amazon™ Web Service).

At a high level, a service factory ("SF") 210 contains the components and pipelines (i.e. processes) to generate the desired services. The specification of the service, including its operating characteristics and the particulars of the legacy system that the service is intended to operate with, can be defined using service requirements 202. A code versioning system 260 is provided to store configuration and specification data related to the service, as well as source code and binary objects related to the service. The code versioning system 260 can be configured to include a common Source Control Management ("SCM") server 262 and a Binary Repository Manager ("BRM") server 264 that are compatible with CI pipelines. Services generated by the SF 210 can be deployed within the SOA environment 270 for testing and official release.

The service requirements 202 are captured by service designers using standard templates offered by the SF 210 to help design a service interface specification. The service interface specification along with other information about the service help define the configuration specifications of the service. These templates help standardize the service requirements collected by the service designers. The complete and correct service requirements 202 become the input to the SF 210 for configuring and generating services for the SOA environment 270. Table 1 outlines an example of the types of information provided in the service requirements 202. Each item within the table corresponds to a "service artifact". For the purposes of the present disclosure an "artifact" can be used to refer to any element that helps describe the function, architecture, and design of a software component, including services for deployment in the SOA Environment 270.

TABLE 1

| | Service Artifacts | | |
|---|---|---|---|
| # | Service Factory Required Input Artifact | Description | Format |
| 1 | Web service interface definition | Web service interface definition document for a SOA service - this is created by following enterprise SOA Service Standards. | WSDL |
| 2 | Web service message schema definition | The XML schema definition documents referenced by WSDL. | XSD |
| 3 | Legacy message layout | A spreadsheet capturing the core legacy message layout used by the legacy system. | Spreadsheet |

TABLE 1-continued

Service Artifacts

| # | Service Factory Required Input Artifact | Description | Format |
|---|---|---|---|
| 4 | Sample legacy messages | This artifact can be created by following a spreadsheet template. Sample legacy messages inserted into the legacy message layout spreadsheet above are provided for testing purposes. | Spreadsheet |
| 5 | Legacy to web service mapping rules description | A spreadsheet capturing core mapping of data from a legacy message to a web service message schema that is created by following a spreadsheet template. | Spreadsheet |
| 6 | Business service profile (metadata) | A spreadsheet capturing the business properties of a SOA service including service name, business domain, service owner, etc. is provided by following a template. | Spreadsheet |
| 7 | Service requirement document | A word document capturing service technical functional requirements such as message exchange patterns, validation requirements, error handling, etc., as well as non-functional requirements such as security, performance, availability, logging, timeout, monitoring, backend connectivity, etc. | Text document |

Where WSDL means Web Service Definition Language; and XSD means XML Schema Definition.

The SF 210 includes a service factory tools component ("SF tools") 212 and a service factory engine component ("SF engine") 220. The SF tools 212 provide the components and resources for a user to interact with the SF 210.

Within the SF tools 212, a service factory integrated development environment ("SF IDE") 214 provides a suitable service factory user interface ("SFUI") 213 for specifying and inputting the service requirements 202 to the SF 210. In some embodiments, the SFUI 213 is designed and implemented as a web-based graphical user interface ("GUI") application to manage a SOA service delivery project and can be deployed as an independent application to submit users' requests to a service factory server ("SFS") 215 which is further described below. User access to the SFUI 213 is controlled by a SF Source Control Management ("SCM") server 262 using various suitable system login methods including single sign-on (SSO), i.e. only valid SCM users can access SFUI 213. The user authorization to the functions of the SFUI 213 and SFS 215 is controlled by the SCM's role-based user authorization. Once a user is authenticated, SFUI 213 allows users, such as project owners, to manage service delivery, project-level configuration and promote services to upper level environments (e.g. from a pre-staging area to a staging/controlled area of the SOA environment 270). SFUI 213 can further be used by users, such as developers of the services, to configure, generate, deploy, and test the services (e.g. DataPower™ services) generated by a SF Service Generator 242.

In some embodiments, SFUI 213 is configurable to provide a development portal intended for project owners or service developers to manage projects or service configurations, respectively. For example, the development portal allows project owners to initialize a service delivery project (e.g. create a new project) and manage the configuration or settings of an existing project, also allows developers to manage the configuration of a SOA service. The configuration parameters for a service delivery project include defining the name of the project, owner, default service version, names of a set of environments, service shared objects' configurations such as front side handlers, port numbers, backend connectivity information for the database and other proprietary systems such as IBM MQ™, URLs of backend services, and the network addresses of the target SOA environment 270. The configuration parameters of a service include, but are not limited to, defining the configuration information for each operation of a service such as the service integration pattern type, backend service connectivity information, data mapping information, and logging and data validations.

In some embodiments, the SFUI 213 is further configurable to provide a service lifecycle portal intended for service developers to generate and deploy services to various SDLC areas of the SOA environment 270. Activities carried out within this portal include reviewing and approving the specifications for the service, managing the build of shared objects (e.g. converting service source code into binary objects), and publication and promotion of the generated service. Shared objects are stored in the BRM server 264 noted above prior to deployment into the SOA environment 270. The lifecycle portal also operates in conjunction with a service gateway 272, such as DataPower™, to deploy the shared objects (i.e. services) to target areas within the SOA environment 270. More specifically, the service gateway 272 provides pre-staging areas such as the Development (DEV) and Shakedown (SHK) environments, and staging areas (i.e. pre-production or controlled areas) such as User Acceptance Test (UAT), Non-Functional Test (NFT), as well as Production (PROD) environments. The lifecycle portal allows project owners to deploy binary objects services such as DataPower™ shared objects, and to promote and approve service deployment to those above-mentioned target environments.

In some embodiments, the SF IDE 214 further includes the above-noted service factory server ("SFS") component 215. The SFS 215 can be deployed as an application to handle requests from the SFUI and trigger pipelines (i.e. processes) residing within the SF engine ("SFE") 220 or manipulate SCM repositories within the SCM server 262 on behalf of users. User access to the SFUI within the SF IDE 214 can be controlled by the SCM server 262 using single sign on ("SSO"). The user authorization to resources is controlled by SCM's role-based user authorization.

In some cases, a legacy system may output data/information in a proprietary or non-standard format which cannot be readily read or processed by other components or computing systems within the SOA environment 270. As such, the legacy data output must be translated into a standard form XML. A message transform builder 216 is provided within the SF tools 212 to enable service developers to create/define data transformation rules or logic for a particular service to carry out the necessary data transformation(s) to transform data intended for communication between the SOA environment 270 and the legacy system. In some embodiments, the message transform builder 216 can be deployed using externally available transformation tools such as the IBM™ WebSphere™ Transformation Extender ("WTX") tool. Such transformations can be referred to as "data mappings" defined by the service developer. These mappings can alternatively be included within the service requirements 202.

A service test cases builder 218 provides an IDE for service testers or service developers to create test cases to automate the testing of the services generated by the SF engine 220 using an automated tester module 248. Test cases created using the service test cases builder 218 can be saved into the code versioning system 260, and more particularly in the SCM server 262, and applied to test the service upon generation.

The code versioning system 260 is provided to store service configuration information and data or source code relevant to the generation of the service. In the present embodiment, the SCM server 262 can be configured to provide SSO sign-in support (as noted above) and further configured to provide versioning support (e.g. for storing versioned source code and other files). The SCM server 262 can be implemented using existing version management tools such as BitBucket™ (a distributed source control management system for storing versioned service source code) or other suitable versioning tools. The BRM server 264 can be configured to perform the functions of a binary artifacts management repository for storing versioned snapshots or release binary artifacts. The BRM server 264 can be implemented using existing artifact repository tools such as Artifactory™ by JFrog™.

Within the SOA environment 270, the service gateway 272 is a service gateway for housing the generated services including web services, accessible via a suitable protocol such as the SOAP (Simple Object Access Protocol) protocol. For example, services created by the SF 210 that have been deployed within the SOA environment 270 may reside within the service gateway 272 to allow clients of the SOA environment 270 to access the generated services. In some embodiments, the SOA environment 270 may be implemented using IBM™ DataPower™ Gateway. A service registry 274 is for publishing and managing metadata (e.g. configuration parameters, non-technical information, description of service, etc.) of services available in the SOA environment 270 for the future discovery and reuse purposes, which is a useful tool for enabling SOA governance practices within the SOA service lifecycle. In some embodiments, the service registry 274 can be implemented using IBM™ WebSphere™ Service Registry and Repository (WSRR) for publishing and managing metadata of SOA services.

The SF engine 220 contains the necessary pipelines (i.e. processes) and components to generate the services in accordance with the service requirements 202. The SF engine 220 can be built following Continuous Integration/Continuous Delivery ("CI/CD") philosophies to produce, deploy, test and publish services. For example, the various pipelines used within the SF engine 220 can be deployed within proprietary and industry standard CI/CD software such as Jenkins™.

In the present embodiment, the SF engine 220 includes two SFE pipelines or processing stages and supporting components. A service interface specification review pipeline 222 is responsible for providing a process for receiving, reviewing and approving the service interface specification of the service being generated. The service interface specification defines the interfaces required for the service to facilitate communicating and data/information exchange with the legacy systems 120 and between the SOA service consumers layer 110 of FIG. 1, and the SOA environment 270.

A service delivery pipeline 240 is responsible for generating the services deployed within the SOA environment 270 and will be described in greater detail below.

A description of the service interface specification review pipeline 222 is now presented in greater detail. A service interface specification review and approval module 224 corresponds to a stage and component within the service interface specification review pipeline 222 that is operable to validate, automatically, the service interface specification. This stage of the service interface specification review pipeline 222 can be triggered through the lifecycle portal of the SFUI 213 noted above, or by the changes in the service interface definition files pushed into the source code repository in SCM server 262. The service interface definition can be provided using files containing Web Service Definition Language (WSDL) and/or XML Schema Definition (XSD). When supplied with the service interface specification, the service interface specification review and approval module 224 checks the specification against enterprise service standards (e.g. XML schema definition standards) established for the SOA environment 270. More specifically, the service interface specification review and approval module 224 is a governance approval checkpoint that is a part of an automated governance enforcement mechanism of the service delivery platform 200, as indicated by a checkpoint indicator 224-1, which operates as a significant checkpoint in the SOA service lifecycle. If the service interface specification does not pass validation (e.g. the interface fails to meet one or more of the enterprise service standards), then the designer of the service interface would be automatically notified (e.g. via email), and the service generation process would not be permitted to proceed further until the interface specification is validated. The imposition of a governance approval checkpoint to maintain the service interface specification in compliance with the enterprise standards and to produce well-formed standardized SOA services. Notifications can be made, for example, by way of a visual indicator, a message, or both an indicator and a message, via the SFUI 213 for presentation. The service interface specification may be modified and subsequently revalidated against established enterprise service standards.

Where the service interface specification is validated, the project owner or solution architect is notified for further review and approval, for example, of the metadata of the service, for example, the service name, domain name, target namespace, etc. This review and approval stage is considered a mandatory governance and approval checkpoint, which can be controlled by the project owner or solution architect for enforcing the service specification and for ensuring that the service design meets particular design standards.

The repository generator module 226 noted previously generates, within the code versioning system 260, the required folders and files based on one or more previously defined repository templates for the service. In the present embodiment, an SCM repository for the source code and files generated for the service can be stored into the SCM server 262.

The service delivery pipeline generator module 228 noted previously corresponds to a stage and component in the service interface specification review pipeline 222 that generates the service delivery pipeline 240 for a specific service to be generated, built, tested, and deployed, promoted, and published. The service repository generator module 226 and service delivery pipeline generator module 228 are depicted as two separate modules which can trigger activation of the service delivery pipeline 240.

A description of the service delivery pipeline 240 is now presented. The service delivery pipeline 240 is intended to automate generation of the service including service code generation, build, deploy, test, publish, and promotion. The service delivery pipeline 240 begins at a service generator module 242 which generates the source code and software components necessary to operate the service and ends at a service promotion module 252 which operates to deploy the service for use within the SOA environment 270. The service promotion module 252 is also a governance approval checkpoint, as indicated by a checkpoint indicator 252-1 which operates as a relevant governance gate or monitoring stage prior to the service being promoted for deployment in the upper levels of the SOA environment 270. This check point is also a part of the automated governance enforcement mechanism of the service delivery platform 200 described earlier with respect to the service interface specification review and approval module 224. As noted previously, this pipeline can be triggered from the SFUI or by polling the SCM repository stored in the SCM server 262 by checking for the completeness of service code generation, such as the completeness of the service mapping and service configuration. In some embodiments, upon completion of a given process, an internal service SDLC state indicator may be switched from a previous state to a new state to indicate the completion.

The service generator module 242 is a stage and component within the service delivery pipeline 240 operable to generate source code and its corresponding shared object code for a desired service. The service source code is generated at least in accordance with the service requirements 202 provide to the SF 210, and taking into consideration of the configurations and settings of the SOA environment 270. Such information can be stored within the SCM server 262 of the code versioning system 260. The code generation can be based on well-known and/or industry-standard service integration design patterns and principles identified and documented in enterprise SOA standards. The generated service source code can be saved to the SCM server 262. In some embodiments, the service generator module 242 would be executed only if the license for the SF engine 220 is validated. In such embodiments, a license service module (not shown) can be provided to authenticate the license prior to executing the service generator module 242.

A service builder module 244 is a stage and component within the service delivery pipeline 240 operable for creating a binary build of the service including the required data transformation(s) associated with the service (e.g. using the API of the WTX builder service described above). More specifically, in the present embodiment, the service source code saved to the SCM server 262 by the service generator module 242 can be retrieved by the service builder module 244 and used as the basis for creating the binary build. The service builder module 244 is also operable to package the binary service build into a distribution file as service binary artifacts, then deploy the artifacts into a binary repository manager, such as Artifactory™ noted above, for tracking and versioning. The binary repository manager may store the binary build in the BRM server 264 (a repository for binaries). In some embodiments, the service builder module 244 is further operable to perform pre-validation such as validating shared objects configuration, service configuration, and service data mapping, synchronization of configuration parameter values such as backend service connectivity information from project level's configuration, and post-build sanity check including shared objects availability, security profile availability, service front side handler validity, and etc. Subsequently, users may be notified of the status of the build (e.g. that the binary build was completed successfully, completed but with warnings, did not complete due to errors, and the like). In some embodiments, the service builder module 244 may be implemented using the same code base as the service generator module 242.

A service deployer module 246 is a stage and component within the service delivery pipeline 240 operable for deploying the specific files versions of a service distribution package with the required access privileges to a target area within the SOA environment 270. As noted earlier, the SOA environment 270 may be divided into different areas for deploying services for the purposes of testing/staging and actual use (i.e. production). The target areas in the SOA environment 270 include DEV, SHK, UAT, NFT, and PROD, which can represent environments of the Service gateway 272 (e.g. a DataPower™ gateway) residing in the SOA environment 270. Similar to the service builder module 244, the service deployer module 246 can further be configured to conduct pre-validation, for example, operation status of global and domain specific share objects used by the service, and post-deployment sanity checks, for example, the operation status of the service and its objects such as frontside handler, and notify relevant users of the deployment status.

The automated tester module 248 noted previously is a stage and component within the service delivery pipeline 240 operable to perform automatic service functional tests against a configured backend with test case data. The data applied by the automated tester module 248 can be generated/provided by the service test cases builder module 218 and stored in the SCM server 262.

A service publisher module 250 is a stage and component within the service delivery pipeline 240 operable for publishing metadata relating to the service (i.e. service metadata), such as a service interface definition document, service specification document, and data mapping sheets containing the information for data mapping during data exchange between a SOA service schema and the message layout of the legacy service of the exposed legacy systems. The information is published to the service registry 274 to allow users to discover/review the availability and functionalities of the service and for consumer applications to consume or use the service.

The service promotion module 252 noted previously is a stage and component within the service delivery pipeline 240 operable to promote the service for deployment. For example, the service promotion module 252 can promote the service during its development cycle from the DEV (development) areas to the PROD (production) areas of the SOA environment 270 mentioned previously. In some embodiments, the service promotion module 252 includes a built-in governance approval checkpoint controlled by the project owner. Upon the owner's approval based on the satisfactory status of the testing results (e.g. by reviewing the outcome of the automated tester module 248 or reviewing the results from the end-to-end tests performed by a quality assurance team), the source code of the service will be promoted to an upper level branch in the SCM repository of the SCM server 262. In the meantime, the service endpoint in the target SOA environment 270 will be set in the service registry 274 and approved for consumption/use. Upon approval, details regarding the approved service can be published to the service registry 274. For example, information stored as service metadata can be extracted for publication within the service registry 274.

Figure 3:
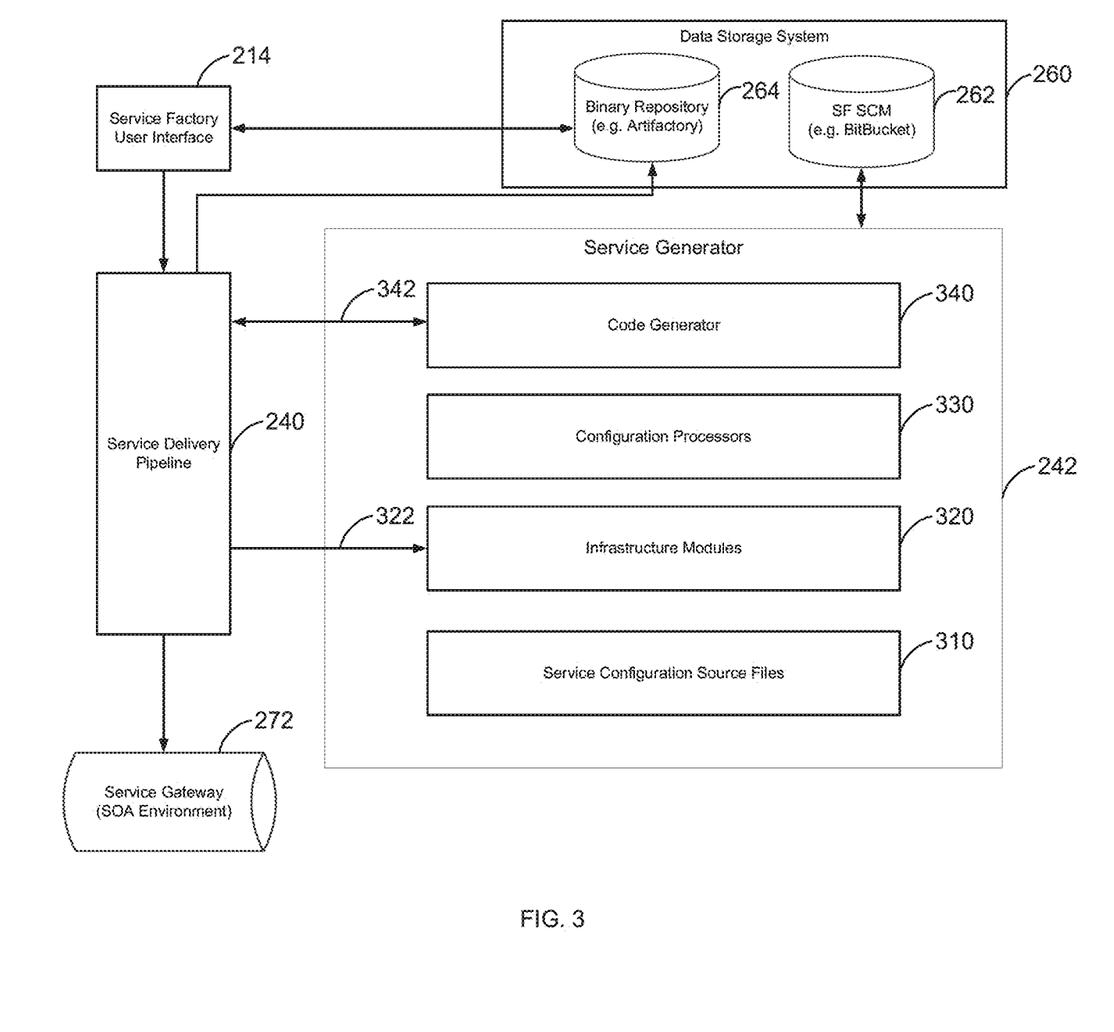
FIG. 3 is a block diagram of a service generator module of the SOA Service Factory of FIG. 2.

Referring now to FIG. 3, shown therein is a block diagram of the service generator module 242 and some associated components of FIG. 2 provided for ease of reference. The service generator module 242 comprises a collection of core components that support the overall service delivery platform 200 and its infrastructural modules, project and service configuration, service code template instantiation, and service deployable artifact packaging. The service code templates are created based on service integration patterns as code fragments for instantiating and composing a complete service based on the service configuration. These templates can be managed in the pattern templates library which is part of a service code generator 340 and described in more detail in the following paragraphs.

In the present embodiment, the service generator module 242 includes a service configuration source files component 310 for receiving source files that define the configuration of the service to be generated. More specifically, the source files contain the fundamental artifacts for the service instance generation. The artifacts can be captured from the sources described in Table 1 above, such as WSDL, XSD, and test data, as well as configuration and manifest files outlining the project and service configuration drafted/edited by service developers by using SFUI 213 within SF IDE 214; binary transformation DPA files generated from binary message transformation tools such as WebSphere™ Transformation Extender (WTX); and XML transformation XSLT files generated from XML transformation tool such as MapForce™. The service configuration source files component 310, includes the above-noted desired configuration source files from the SCM server 262 for the service being generated.

An infrastructure modules component 320 is operable to provide supporting modules that are used by the service generator 242 to generate components for the service when the service delivery pipeline 240 is activated. The infrastructure modules component 320 includes a library of service source code pattern templates for the service generator 242 to instantiate the service based on its configuration; a data validation module for validating any request data received by the generated service at its runtime; a security module for handling service required security at its runtime; a logging module for logging service transactions at its runtime based on its configuration; an error handling module for handling service exception or errors during its runtime based on its configuration; and a PCI-compliance module for supporting service required PCI-DSS (Payment Card Industry Data Security Standard) standard at its runtime, for supporting the logging module to mask any sensitive customer card data, as appropriate for the application/use of the service. The service source code pattern templates library includes different service code implementation templates based on the service integration patterns such as legacy gateway patterns, composition patterns, and the like. When the service delivery pipeline 240 is activated, the service factory will extract the appliance version-aware infrastructure modules dynamically to provide the desired functionalities noted herein, as represented by arrow 322. These infrastructure modules can be used by the service generator 242 to instantiate and assemble the service code implementation based on its configuration.

A configuration processors component 330 is operable to support the service generator 242 to process environment and non-environment parameter configuration, template instantiation, dynamic task generation, build flow control, and builder agent (e.g. for DataPower™). The build flow control manages the main flow of service code generation, which calls configuration processors 330 and infrastructure modules 320. The template instantiation component is called for instantiating service code based on the configured service integration pattern. The dynamic task generation component is called for generating a build task to transform service configuration template files based on service specific dynamic configuration values during the service generation process.

A code generator component 340 is operable to emit pattern assets and assembles the deployable code packages corresponding to a service. The code generator component 340 is invoked by the service delivery pipeline 240 at runtime, for example, by way of a call as represented by arrow 342.

Upon invocation, the code generator component 340 retrieves the service configuration files from the service configuration source files module 310. The configuration processor activates a builder agent and a build flow controller (not shown) within the configuration processor component 330 to supervise the code generation process carried out by the code generator. Based on the service interface configuration as defined in the service configuration files, a pattern asset generator module (not shown) within the code generator component 340 outputs source code for the service. To output the source code, the pattern assets generator invokes a template instantiator component within the configuration processors component 340 to select suitable code pattern or design templates from the pattern templates library within the infrastructure modules component 320 based on the interface configuration of the service. The templated code is translated by a template translator to a form that is compatible for execution within a target environment such as the SOA environment 270. The outputted source code therefore provides the service with the specified interfaces. Additional pattern templates are used to generate source code to enable the desired data transformations. The source code that is outputted by the pattern assets generator and assembled into a source code package by a package assembler within the code generator component 340.

The examples and corresponding diagrams used herein are for illustrative purposes only. Different configurations and terminology can be used without departing from the principles expressed herein.

Although the invention has been described with reference to certain specific embodiments, various modifications thereof will be apparent to those skilled in the art without departing from the scope of the invention. The scope of the claims should not be limited by the illustrative embodiments set forth in the examples, but should be given the broadest interpretation consistent with the description as a whole.

The invention claimed is:

1. A method to automatically generate a software service for exchanging data and messages between a first computing system operating within a target environment and a second computing system, the method comprising:
- providing a configuration specification defining the software service, the configuration specification comprising one or more service artifacts describing at least one of a function of the software service, an architecture of the software service, and a design of the software service;
- selecting at least one pattern template from a pattern templates library based on the one or more service artifacts of the configuration specification;
- outputting source code corresponding to the software service, the outputted source code translated from programming code provided in the selected at least one pattern template to a form that is compatible for execution within the target environment; and
- assembling the outputted source code into a source code package corresponding to the software service; wherein the configuration specification comprises at least one data transformation rule for transforming data by the software service, the data being exchanged between the first computing system and the second computing system;
- the target environment is a service oriented architecture environment that is incompatible with the second computing system; and
- the second computing system is a legacy computing system that is incompatible with the first computing system.

2. The method of claim 1 further comprising validating the configuration specification prior to selecting the at least one pattern template.

3. The method of claim 1 further comprising building the source code package to binary objects corresponding to the software service.

4. The method of claim 3 further comprising testing the software service upon deploying the binary objects.

5. The method of claim 4 further comprising promoting the software service for use upon publishing the software service.

6. The method of claim 1, wherein the configuration specification defines at least one first computing system interface for communicating and exchanging data and messages between the software service and the first computing system, and a second computing system interface for communicating and exchanging data and messages between the software service and the second computing system.

7. A system to automatically generate a software service for exchanging data and messages between a first computing system operating within a target environment and a second computing system, the system comprising:
- a service configuration pipeline operable to receive a configuration specification defining the software service, the configuration specification comprising one or more service artifacts describing at least one of a function of the software service, an architecture of the software service, and a design of the software service; and
- a service delivery pipeline operable to:
- select at least one pattern template from a pattern templates library based on the one or more service artifacts of the configuration specification;
- output source code corresponding to the software service, the outputted source code translated from programming code provided in the selected at least one pattern template to a form that is compatible for execution within the target environment; and
- assemble the outputted source code into a source code package corresponding to the software service; wherein the configuration specification comprises at least one data transformation rule for transforming data by the software service, the data being exchanged between the first computing system and the second computing system;
- the target environment is a service oriented architecture environment that is incompatible with the second computing system; and
- the second computing system is a legacy computing system that is incompatible with the first computing system.

8. The system of claim 7 further comprising a data storage system to store the source code package.

9. The system of claim 7 further comprising a graphical user interface for inputting the configuration specification by a user.

10. The system of claim 7, wherein the service configuration pipeline is activated prior to the service delivery pipeline is activated.

11. The system of claim 7, wherein the service configuration pipeline is further operable to validate the configuration specification prior to selecting the at least one pattern template.

12. The system of claim 7, wherein the service delivery pipeline is further operable to build the source code package to binary objects corresponding to the software service.

13. The system of claim 7, wherein the configuration specification defines at least one first computing system interface for communicating and exchanging data and messages between the software service and the first computing system, and further defines a second computing system interface for communicating and exchanging data and messages between the software service and the second computing system.

* * * * *